United States Patent

Amano

(10) Patent No.: US 8,645,908 B2
(45) Date of Patent: Feb. 4, 2014

(54) METHOD FOR GENERATING SPECIFICATIONS OF STATIC TEST

(75) Inventor: Tomio Amano, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/862,264

(22) Filed: Aug. 24, 2010

(65) Prior Publication Data

US 2012/0054713 A1 Mar. 1, 2012

(51) Int. Cl.
*G06F 9/44* (2006.01)

(52) U.S. Cl.
USPC ............. 717/104; 717/33; 717/114; 717/106; 717/108; 719/328; 719/313

(58) Field of Classification Search
USPC .............................. 717/104, 33, 114, 106, 108
See application file for complete search history.

(56) References Cited

U.S. PATENT DOCUMENTS

| | | | | |
|---|---|---|---|---|
| 6,643,652 | B2 * | 11/2003 | Helgeson et al. | 1/1 |
| 7,546,602 | B2 * | 6/2009 | Hejlsberg et al. | 719/313 |
| 2005/0076328 | A1 * | 4/2005 | Berenbach et al. | 717/104 |
| 2007/0220342 | A1 * | 9/2007 | Vieira et al. | 714/33 |
| 2007/0260926 | A1 | 11/2007 | Forlenza et al. | |
| 2008/0189289 | A1 * | 8/2008 | Dettinger et al. | 707/10 |
| 2009/0300579 | A1 * | 12/2009 | Dutta et al. | 717/105 |

FOREIGN PATENT DOCUMENTS

| | | | |
|---|---|---|---|
| JP | 9237180 | A | 9/1997 |
| JP | 10063492 | A | 3/1998 |
| JP | 2004054414 | A | 2/2004 |
| JP | 2006163599 | A | 6/2006 |
| JP | 2006190332 | A | 7/2006 |
| JP | 2007305051 | A | 11/2007 |
| JP | 2009157824 | A | 7/2009 |

* cited by examiner

*Primary Examiner* — Vanel Frenel

(74) *Attorney, Agent, or Firm* — George R. McGuire; Blaine T. Bettinger; Bond Schoeneck & King, PLLC

(57) ABSTRACT

A computer implemented rule for verifying consistency in design documents is modeled as a set of associations among deliverable components, and a descriptive text explaining the specification is generated in combination with a text template.

13 Claims, 9 Drawing Sheets

METHOD FOR GENERATING SPECIFICATIONS OF STATIC TEST

FIELD OF THE INVENTION

The present invention relates to automatic generation of a specification text for testing a software design document.

BACKGROUND

A static test is an activity that evaluates quality based on a source code and intermediate deliverables without executing a test subject. A static test subject includes system resources such as design documents and programs. The static test for design documents is classified into a semantic check and a formal check. In the semantic check, a technique such as review and inspection is employed. The formal check comprises verification of consistency among deliverables, validation of traceability, verification of description, omission of fixed form items, and detection of overlapped descriptions, among several others.

In a large-scale development project, such as one with 600 or more participants in the design phase, a static test specification is manually prepared as needed and performs a consistency check of design documents. This typically causes several problems. For example, the correspondence between the error and its cause can be unclear. In some cases multiple OR conditions are described in text that shows a check specification outputting a same error number, which means that a developer cannot use the indicated error number to uniquely identify the cause. There can also be problems with variation in text style. With regard to similar content checks, specifications and error messages are described with different text styles. Since a Global Delivery ("GD") member sometimes describes the specification, some expressions are hard to understand in some languages.

Those who refer to the specification text of the test include not only developers of the test tool and practitioners of the test, but also a number of developers that modify design documents upon receiving the test results. Low quality and unclear specification text may impact work efficiency across the entire project.

BRIEF SUMMARY

It is therefore a principal object and advantage of the present invention to provide the automatic generation of a specification text for testing a software design document.

It is another object and advantage of the present invention to provide a static test that describes discrete check rules for every error condition.

Other objects and advantages of the present invention will in part be obvious, and in part appear hereinafter.

In accordance with the foregoing objects and advantages, the present invention provides a method for generation of static test specification text using the following steps: (i) the association between at least two components of a correlated design document is modeled; (ii) a check rule is modeled as an association class between the two components; (iii) a template for the text of each association class is defined; and (iv) a specification text is created.

A second aspect of the present invention provides a method for generation of static test specification text in which the step of creating the text comprises the steps of (i) connecting the template for the text of each association class; (ii) defining a specification text for the check rule; and (iii) defining a specification text for each association class.

A third aspect of the present invention provides a method for generation of static test specification text in which, when the text of an association class contains a variable portion, the step of a specification text further comprises fixing the variable portion by following the associations between the at least two components of the design document.

A fourth aspect of the present invention provides an existence check rule comprising the step of determining whether at least one component of a first design document is found in a second design document.

A fifth aspect of the present invention provides an identity check rule comprising the step of determining whether the at least one component of said first design document coincides with a corresponding component identified by the existence check rule in the second design document.

A sixth aspect of the present invention provides a computer system for generating static test specification text comprising: (i) means for modeling an association between two or more components of a first design document; (ii) means for modeling at least one check rule as an association class among the two or more components; (iii) means for defining a template for the text of each association class; and (iv) means for creating a specification text.

A seventh aspect of the present invention provides a computer system for generating static test specification text, wherein the computer system further comprises: (i) means for connecting the template for the text of each association class; (ii) means for defining a specification text for the check rule; and (iii) means for defining a specification text for each association class.

An eighth aspect of the present invention provides a computer system for generating static test specification text, wherein the means for creating a specification text further comprises means for fixing the variable portion by following the associations between the two or more components of the design document, when the text of an association class contains a variable portion.

A ninth aspect of the present invention provides a computer system for generating static test specification text, wherein the system further comprises means for creating an existence check rule, wherein the existence check rule comprises means for determining whether at least one component of a first design document is found in a second design document.

A tenth aspect of the present invention provides a computer system for generating static test specification text, wherein the system further comprises means for creating an identity check rule that comprises means for determining whether the one or more component(s) of the first design document coincides with a corresponding component identified by the existence check rule in the second design document.

The present invention also provides a computer program for generating static test specification text. The computer program includes: (i) means for modeling an association between two or more components of a first design document; (ii) means for modeling at least one check rule as an association class among the two or more components; (iii) means for defining a template for the text of each association class; and (iv) means for creating a specification text.

The present invention provides a computer program for generating static test specification text further comprising: (i) means for connecting the template for the text of each association class; (ii) means for defining a specification text for the check rule; and (iii) means for defining a specification text for each association class.

The present invention further provides a computer program for generating static test specification text wherein the means for creating a specification text further means for fixing the variable portion by following the associations between the at least two components of the design document, when the text of an association class contains a variable portion.

The present invention also provides a computer program for generating static test specification text wherein the program further comprises means for creating an existence check rule, wherein the existence check rule comprises means for determining whether at least one component of a first design document is found in a second design document.

The present invention further provides a computer program for generating static test specification text comprising means for creating an identity check rule, wherein the identity check rule comprises means for determining whether the at least one component of the first design document coincides with a corresponding component identified by the existence check rule in the second design document.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

Figure 1:
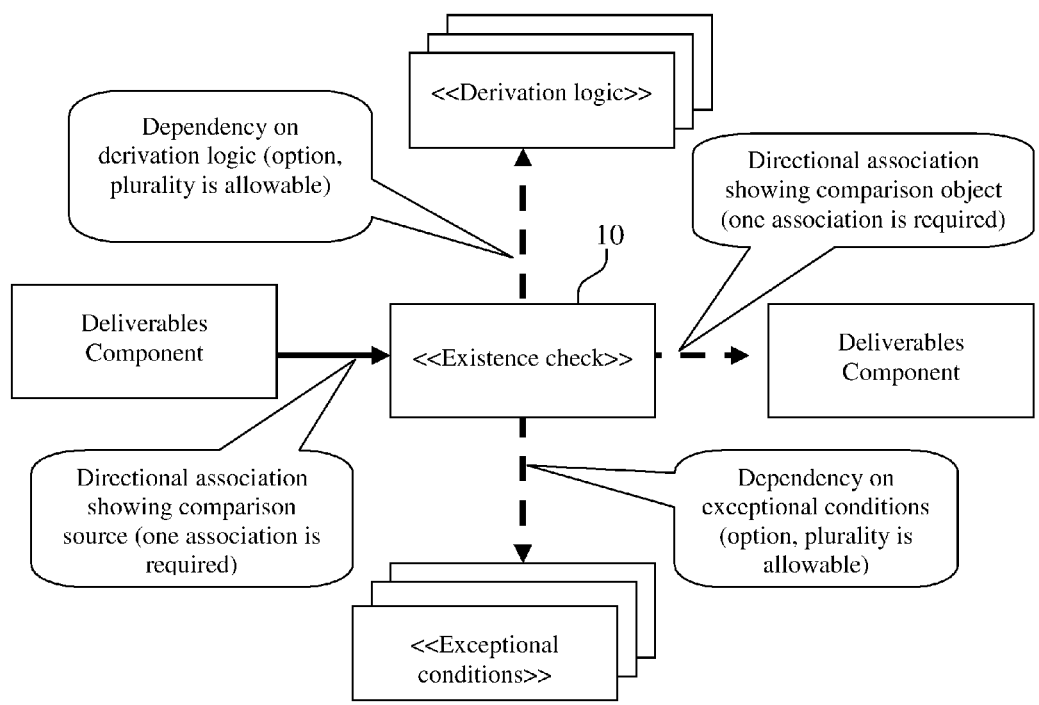
FIG. 1 is a block diagram of the allowable associations between the existence check and other components according to one embodiment of the present invention.

Referring now to the drawings, wherein like reference numerals refer to like parts throughout, descriptive texts of consistency check specifications are generated from a model that uses the following method. In step one, the structure (i.e., the association between components) of each design document (such as an Excel file) is modeled by a standardized modeling language such as Unified Modeling Language ("UML"). The components of an Excel file, for example, can be the <<Cell>>, <<Row>>, or <<Sheet>> components, among many others.

In step two, the check rule is modeled as an association class among components of the above model.

Figure 2:
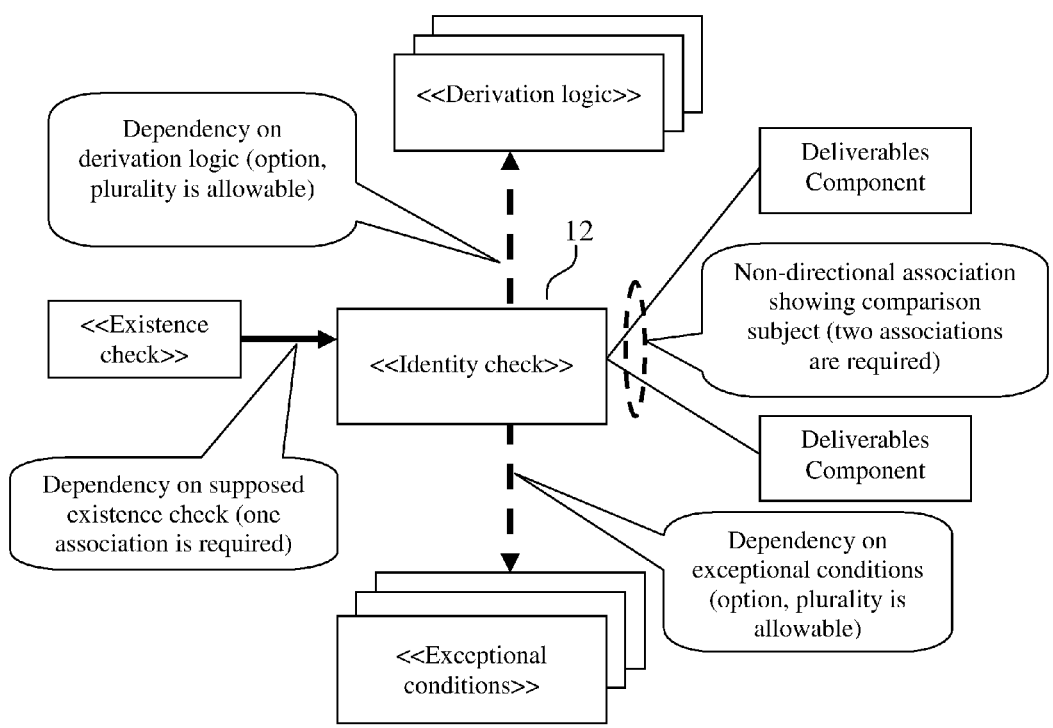
FIG. 2 is a block diagram of the allowable associations between the identity check and other components according to one embodiment of the present invention.

For the "existence check" and "identity check", which are subject to the primary check rule, a rule is defined that specifies what kind of association is owned with a design document component class. FIG. 1 shows the allowable associations between the "existence check," denoted by numeral 10, and other components, according to one embodiment of the present invention. FIG. 2 shows the allowable associations between the "identity check," denoted by numeral 12, and other components.

In step three of the method, a text template describing the specification is defined for each class, constituting a check rule. In step four, after the preparation of the model, a descriptive check specification text is created according to the following procedure. First, the texts in the template are connected so to be output, and these are defined for the relevant class of the check rule and the class on which the class is dependent. Second, when there are variable portions such as a document name in the text of the template, the content of the variable portions is fixed by following the associations between components of the document.

Figure 3:
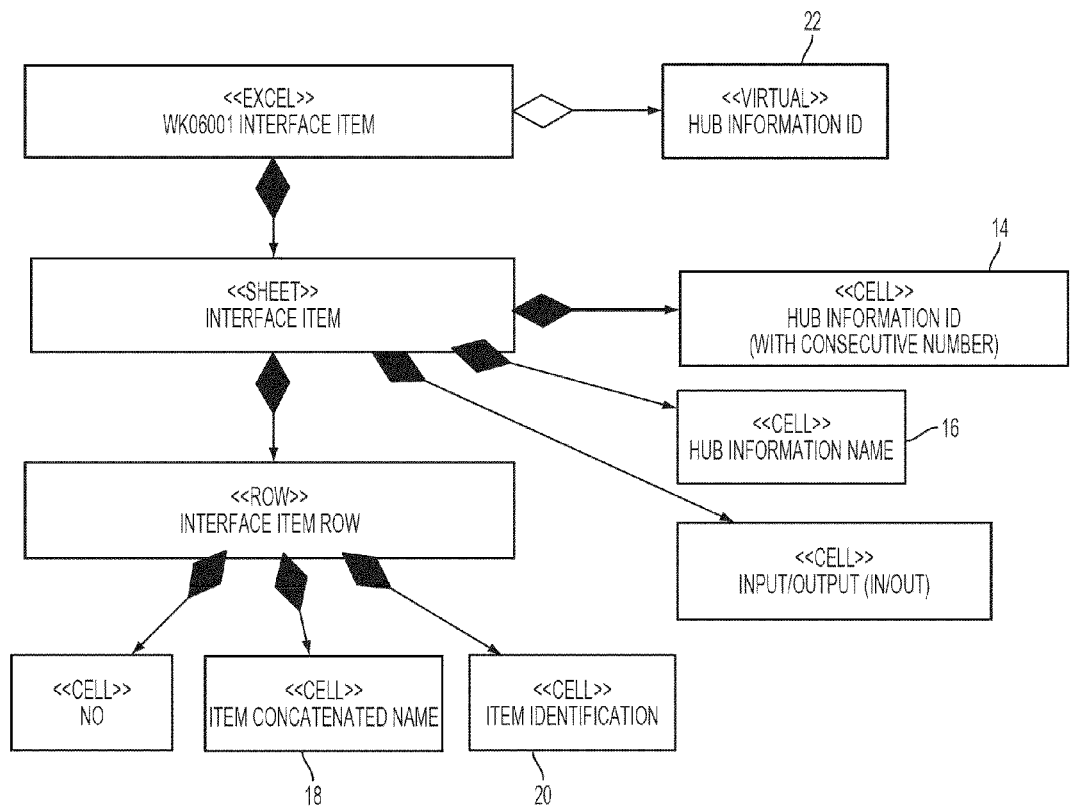
FIG. 3 is an example of a class diagram showing the structure of deliverables.

FIG. 3 is a class diagram showing a structure of a typical design document. In this embodiment, an Excel document is used. Since it is an Excel document, four stereotypes are defined according to a general Excel file structure to classify each component; the cell, sheet, row, and virtual stereotypes. Components that are subject to consistency checks belong to a <<Cell>> stereotype. As shown in FIG. 3, there are components described for each sheet, such as "hub information ID" 14 and "hub information name" 16, and components for each plurality of raw data (expressed by the <<Row>> stereotype) constituting the sheet, such as an "item concatenated name" 18 or an "item identification" 20. The <<Virtual>> stereotype 22 is not directly described in the document; however, it expresses information subjected to consistency checks that is derived from the described components by some logic. <<Virtual>> stereotype 22 is used to express cases where information has a hub information ID with a minor number described in the document, although a hub information ID with the branch number removed is used for the consistency check. Five elements necessary for expressing the rule are extracted and their relationship with each other is defined in Table 1.

TABLE 1

| Association of Rule Constitution Elements | |
| --- | --- |
| Existence check | Uni-directional associations showing comparison source (one association is required) |
| | Effective association showing comparison object (one association is required) |
| | Dependency on derivation logic (option, plurality is allowable) |
| | Dependency on exceptional conditions (option, plurality is allowable) |
| Identity check | Non-directional association showing comparison subject (Two associations are required) |
| | Dependency on supposed existence check (one association is required) |
| | Dependency on derivation logic (option, plurality is allowable) |
| | Dependency on exception conditions (option, plurality is allowable) |
| Discrete check | Uni-directional associations showing check subject (one association is required) |
| | Dependency on supposed existence check (option, plurality is not allowed) |
| | Dependency on derivation logic (option, plurality is allowable) |
| | Dependency on exception conditions (option, plurality is allowable) |
| Derivation logic | Dependency from other checks (plurality is allowable) |
| | Effective association from derivation source one association is required) |
| | Effective association with derivation object (one association is required) |
| Exceptional conditions | Dependency from other checks (plurality is allowable) |

<<Existence check>> is a typical consistency check pattern. It is a rule by which to check whether what exists in document A also exists in document B. <<Identity check>> is another typical pattern: it is a rule for a set of components identified by the existence check, to check whether their accompanying data coincide with each other. Rules other than the above two patterns are made as a <<Discrete check>>. In addition, <<Derivation logic>> shows a logic for generating the above-mentioned <<Virtual>> component. <<Exceptional conditions>> shows a description of exceptions, such that the check is performed only when item identification is "discrete" or "common".

Figure 4:
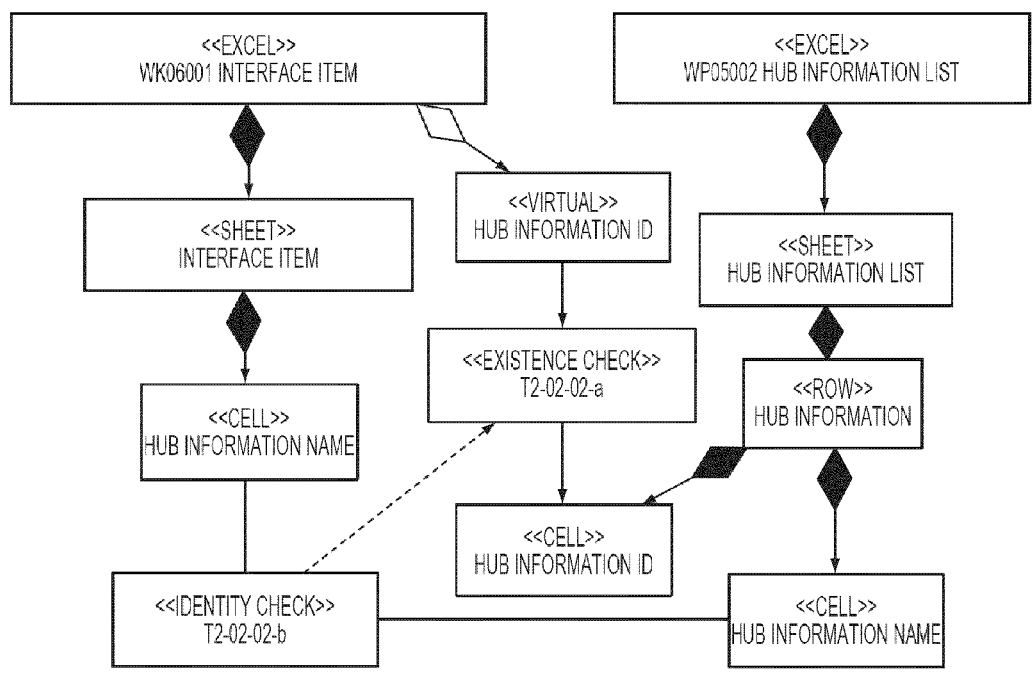
FIG. 4 is an example of a class diagram showing the check rule.

Model expressions are shown in FIG. 4 for the existence check ("items corresponding to the hub information ID in the interface items must exist in the hub information list") and the identity check ("between deliverables in which existence of items is confirmed, the contents of hub information name must coincide with each other"). Dependency (denoted by the dotted line arrow in FIG. 4) on the existence check from the identity check shows that only when the hub information ID exists in both deliverables is the coincidence of hub information name checked.

For each component of the check rule shown in Table 1, a template for a specification description text is defined to generate a text by combining these templates based on dependency and association among components. See, for example, Table 2. In addition, templates are defined for <<discrete check>> and <<exceptional conditions>>.

TABLE 2

Example of Template Text Description

Specification text template for <<Existence check>>
To confirm that "C", which coincides with "B" contained in A, is included in D.
Specification text template for <<Identity check>>
To confirm that C in B, specified by A, coincides with E in D.
Specification text template for <<Derivation logic>>
A is derived from D by derivation logic B(C).

Documents in the existence check and identity check templates and the name parts (i.e., the underlined parts in the template in Table 2) of their components are variable, and values are determined by following the association between components. For example, the name D of the variable part in the template for the existence check rule T2-02-02-a in FIG. 4 can be determined through the following method: (i) identifying the component (in this example, the <<Cell>> hub information ID) to be a comparison object of the existence check from effective association; and (ii) identifying a document name (such as "WP05002_hub information list"), which is the highest grade element, by following the composition association.

Figure 5:
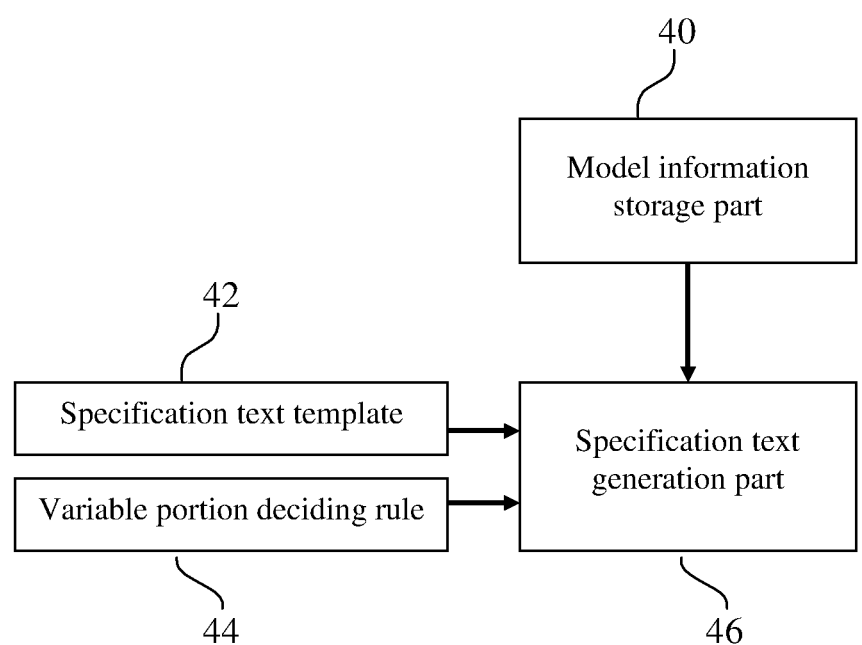
FIG. 5 is a flow chart showing a configuration example according to one embodiment of the present invention.

FIG. 5 shows a configuration example when applying the present invention. In the model information storage part 40, design documents (prepared by Rational Software Modeler, etc.) and rules are stored as XML data. A specification text template 42 is a template of a text shown in Table 2, and a variable portion deciding rule 44 is a rule to decide variable portions in the template by searching model information. Both specification text template 42 and variable portion deciding rule 44 are described by XSLT.

Figure 6:
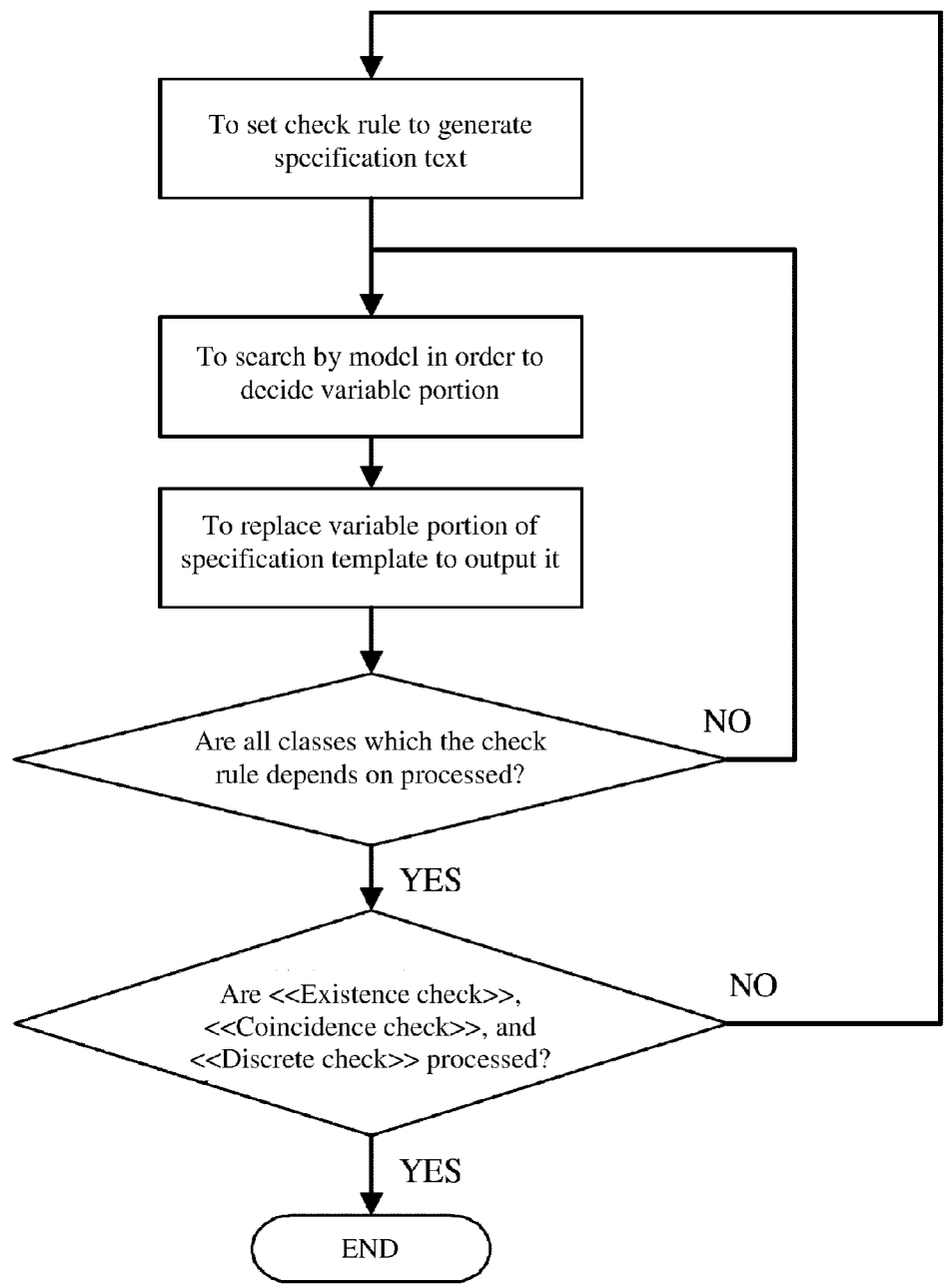
FIG. 6 is a decision diagram showing processing of specification text generation part.
Figure 7:
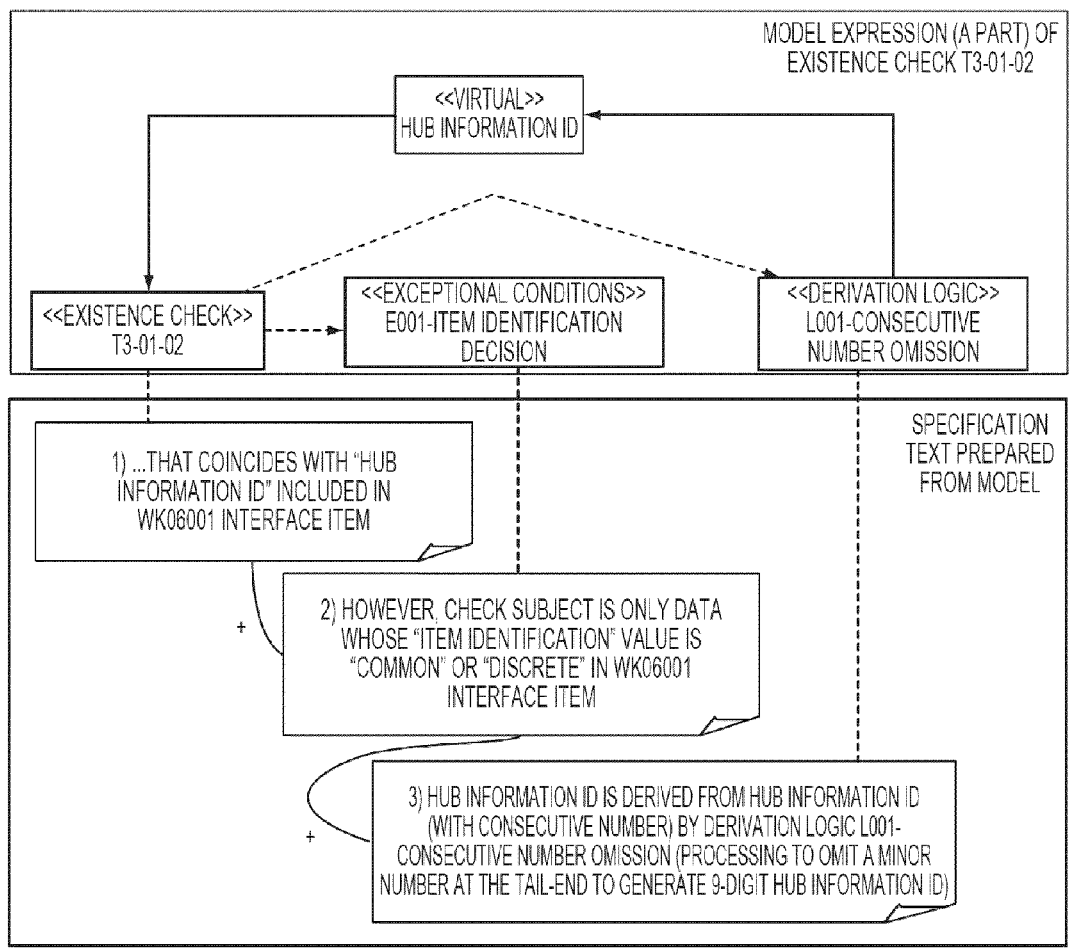
FIG. 7 is a flow chart showing an example of specification text generation from a model.
Figure 8:
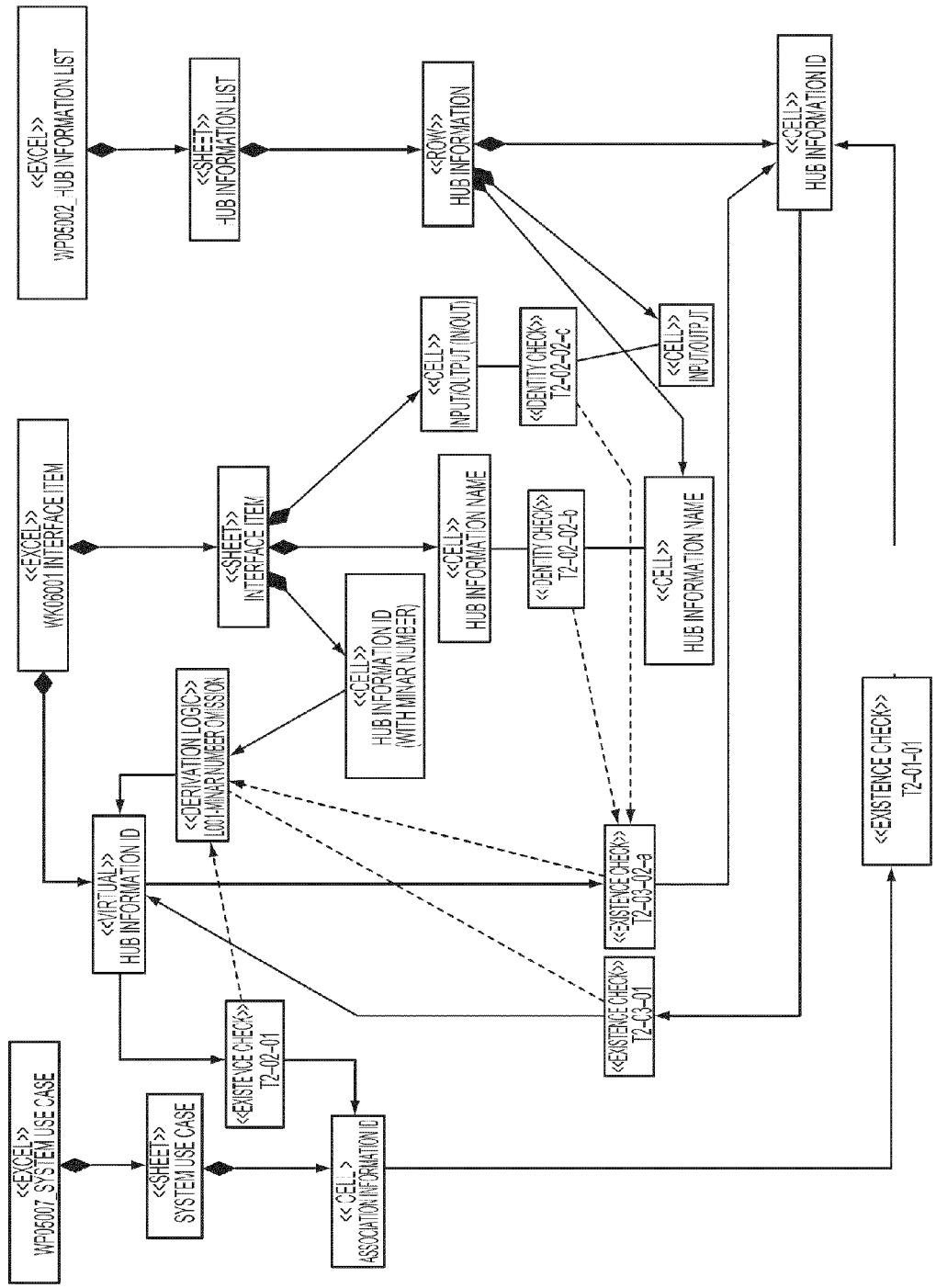
FIG. 8 is a block diagram showing the structure of the document and the check rule that are modeled in line with the design document according to one embodiment of the present invention.

The specification text generation part 46 converts model information expressed by XML, using the XSLT showing specification text template 42 and variable portion deciding rule 44 to generate the specification text. FIG. 6 shows processing of the specification text generation part according to one embodiment of the present invention.

When modeling check rules actually required for a project into a method used by the present invention, it is possible to express it with 7 existence checks, 3 identity checks, and one discrete check. By preparing one specification text template for the existence check and the identity check respectively, most specification text can be generated from the template regarding the actual rule.

By automatically generating specification text, a method of describing the model is specified regarding the existence check and the identity check, which accounts for most of the check rules. As a result, when there are multiple error conditions, it is forced to describe discrete check rules for each condition. Therefore, correspondence of an error number to the cause of the error (a condition determined as an error) is guaranteed to be on a one-to-one basis, so that problems where "correspondence of the error with its cause is not clear" can be solved. Introducing a text template eliminates the possibility of expressions varying each time discrete specifications are decided.

In Table 3 is an example of a traceability check specification prepared by a consistency rule.

TABLE 3

Traceability Check Specification
Traceability check specification (prepared by consistency rule 01.xml)

| Error number | Comparison source file | Comparison object file | Error messages | Check specification |
| --- | --- | --- | --- | --- |
| T2-01-01 | WP05007_System use case | WP05002_Hub information list | No Hub information ID that matches the comparison source in the WP05002_Hub information list. | To confirm that "Hub information ID" that matches all the "association information ID" included in the WP05007_system use case exists somewhere in WP05002_Hub information list. |
| T2-02-01 | WK06001_interface item | WP05007_System use case | No association information ID that matches the comparison source in WP05007_system use case. | To confirm that "association information ID" that matches all the "Hub information ID" included in the WK06001_interface items exists somewhere in WP05007_ system use case. |

TABLE 3-continued

Traceability Check Specification
Traceability check specification (prepared by consistency rule 01.xml)

| Error number | Comparison source file | Comparison object file | Error messages | Check specification |
|---|---|---|---|---|
| T2-02-02-a | WK06001_interface item | WP05002_Hub information list | No Hub information ID that matches the comparison source in the WP05002_Hub information list. | "To confirm that "Hub information ID" that matches all the "Hub information ID" included in the new interface items exists somewhere in WP05002_Hub information list. The Hub information ID is derived from the Hub information ID (with minor number) by derivation logic L001-minar number omission (processing to omit a minor number at the tail-end to generate 9-digit Hub information ID). |
| T2-03-01 | WP05002_Hub information list | WK06001_interface item | No Hub information ID that matches the comparison source in the WK06001_interface items. | To confirm that "Hub information ID" that matches all the "Hub information ID" included in the WP05002_Hub information list exists somewhere in WK06001_interface items. The Hub information ID is derived from the Hub information ID (with minor number) by derivation logic L001-minor number omission (processing to omit a minor number at the tail-end to generate 9-digit Hub information ID). |

Figure 9:
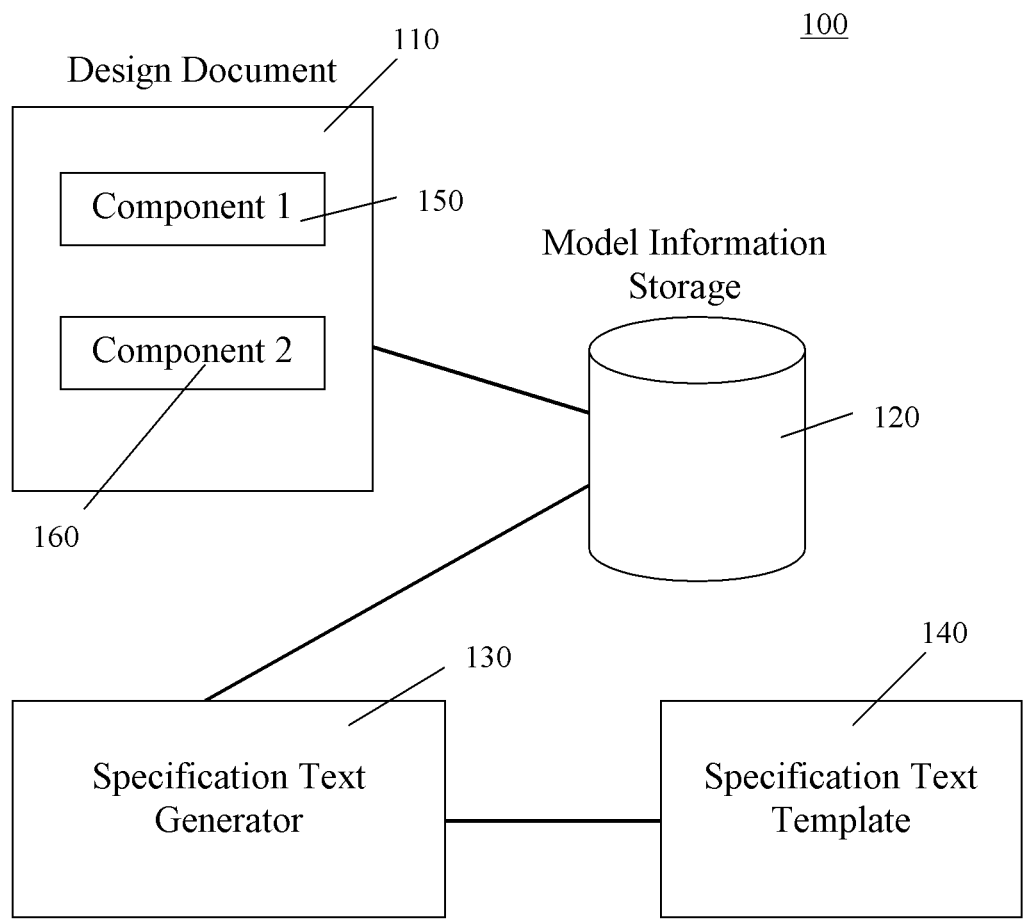
FIG. 9 is a block diagram of a computer system for generating static test specification text according to one embodiment of the present invention.

FIG. 9 shows a block diagram of a computer system 100 for generating static test specification text. In the model information storage 120, one or more design documents and rules are stored. Specification text template 140 is a template of text, such as that shown in Table 2. A specification text generator 130 converts model information using specification text template 140 and at least a variable portion deciding rule, found in storage 120, to generate the specification text.

According to yet another embodiment of the present invention is a computer program for generating static test specification text. The computer program is preferably stored in permanent memory such as the storage device depicted in FIG. 9. The computer program can include program instructions, in the form of computer code, a linked application, or other known methods of program execution, to model at least one association between two or more components of a first design document, such as document 110 in FIG. 9, as described above. The program includes program instructions for modeling at least one check rule as an association class among the two components of the document. The program also defines a template for the text of each association class, and then creates a specification text. The computer program can alternatively include a GUI for user interaction, including allowing a user to modify one or more attributes of the program.

In a further embodiment, the computer program includes instructions for connecting the defined template for the text of each association class, and defines a specification text for the check rule and each association class.

Although the present invention has been described in connection with a preferred embodiment, it should be understood that modifications, alterations, and additions can be made to the invention without departing from the scope of the invention as defined by the claims.

What is claimed is:

1. A computer-implemented method for the generation of static test specification text, the method comprising:
   modeling, utilizing a processor, an association between at least two components of a first design document;
   modeling, using the processor, at least one check rule as an association class among said at least two components, wherein said modeling at least one check rule step comprises the following steps: (i) determining, using an existence check rule, whether at least one component of a first design document is found in a second design document, and (ii) determining, using an identity check rule, whether said at least one component of said first design document coincides with a corresponding component identified by said existence check rule in said second design document;
   defining, using the processor, a template for the text of each association class based on the determinations of the existence check rule and the identity check rule; and
   creating, using the processor, a specification text.

2. The computer-implemented method of claim 1, wherein the step of creating a specification text further comprises:
   connecting said template for the text of each association class;
   defining a specification text for said check rule; and
   defining a specification text for each association class.

3. The computer-implemented method of claim 2, wherein the step of creating a specification text further comprises the following when the text of an association class contains a variable portion:

fixing said variable portion by following the associations between said at least two components of said design document.

4. The computer-implemented method of claim 1, wherein said modeling steps utilize a standardized modeling language.

5. The computer-implemented method of claim 4, wherein said standardized modeling language is Unified Modeling Language ("UML").

6. The computer-implemented method of claim 1, wherein said at least one check rule is stored as Extensible Markup Language (XML) data.

7. The computer-implemented method of claim 1, wherein said template is described by XSL Transformations (XSLT).

8. A computer system for generating static test specification text, said system comprising:

a first design document comprising at least two components;

a processor adapted to model an association between said at least two components of said first design document and further wherein said processor is adapted to model at least one check rule as an association class among said at least two components, wherein modeling at least one check rule as an association class comprises (i) determining, using an existence check rule, whether at least one component of a first design document is found in a second design document, and (ii) determining, using an identity check rule, whether said at least one component of said first design document coincides with a corresponding component identified by said existence check rule in said second design document;

a defined template for the text of each association class, wherein said defined template is based on the determinations of the existence check rule and the identity check rule; and a specification text generator adapted to create a specification text, wherein said specification text generator creates said specification text using said defined template.

9. The computer system according to claim 8, further comprising:

wherein said processor is further adapted to connect said template for the text of each association class;

wherein said specification text generator is further adapted to define a specification text for said check rule and to define a specification text for each association class.

10. The computer system according to claim 8, wherein said specification text generator is further adapted to, when the text of an association class contains a variable portion, fix said variable portion by following the associations between said at least two components of said design document.

11. A computer program stored on a computer readable storage medium, the program comprising instructions for generating static test specification text, said computer program comprising:

instructions for modeling an association between at least two components of a first design document;

instructions for modeling at least one check rule as an association class among said at least two components, wherein modeling at least one check rule comprises: (i) determining, using an existence check rule, whether at least one component of a first design document is found in a second design document; determining, using an identity check rule, whether said at least one component of said first design document coincides with a corresponding component identified by said existence check rule in said second design document;

instructions for defining a template for the text of each association class, wherein said template is based on the determinations of the existence check rule and the identity check rule; and instructions for creating a specification text.

12. The computer program according to claim 11, further comprising:

instructions for connecting said template for the text of each association class;

instructions for defining a specification text for said check rule; and instructions for defining a specification text for each association class.

13. The computer program according to claim 11, wherein the instructions for creating a specification text further comprise the following when the text of an association class contains a variable portion:

instructions for fixing said variable portion by following the associations between said at least two components of said design document.

\* \* \* \* \*